United States Patent [19]

Bertram et al.

[11] 4,085,398

[45] Apr. 18, 1978

[54] THIN FILM RESISTANCE TEMPERATURE DETECTOR

[75] Inventors: Robert W. Bertram, Burlington; Graham Norgate, Oakville; Robert Isles, Mississauga, all of Canada

[73] Assignee: Atomic Energy of Canada Limited, Ottawa, Canada

[21] Appl. No.: 805,134

[22] Filed: Jun. 9, 1977

[30] Foreign Application Priority Data

Jun. 30, 1976 Canada ................................ 256112

[51] Int. Cl.$^2$ ........................................... H01C 10/16
[52] U.S. Cl. ........................................ 338/25; 29/612; 29/619; 338/28
[58] Field of Search .................... 338/28, 22, 23, 24, 338/25, 229, 238, 243, 252; 29/612, 613, 614, 619, 621; 73/362 AR, 362 SC, 359

[56] References Cited

U.S. PATENT DOCUMENTS

| 2,516,873 | 8/1950 | Havens et al. ............... 29/612 X |
| 2,686,244 | 8/1954 | Dahm et al. .................. 338/23 X |
| 2,728,832 | 12/1955 | Hoffman ........................... 338/28 |
| 3,005,171 | 10/1961 | Beckman .......................... 338/28 |
| 3,435,400 | 3/1969 | Beckman ................... 73/362 AR X |

*Primary Examiner*—C. L. Albritton
*Attorney, Agent, or Firm*—Edward Rymek

[57] ABSTRACT

The resistance temperature detector (RTD) includes a substrate of refractory dielectric material having two or more holes bored through it. A plug of electrically conductive material is fixed within each hole in proximity to one end surface of the substrate, with the plug surface preferably having a concave meniscus shape and consisting of a metal alloy such as Ti-Ni. Lead wires, such as Ni wires, are located in the holes and are connected to the plugs through the other end surface. A film of temperature dependent resistance material is deposited on the one end surface of the substrate and is connected to the two plugs. The film may consist of a thin sensing film of metal such as platinum or of a semiconductor material, deposited in a selected pattern on the substrate and in direct contact with the plugs, or the sensing film may be deposited so as to connect pads of electrical conducting material which are deposited to cover at least a portion of the plugs. The end surface of the RTD may further have a layer of electrical insulating material to protect the sensing film.

12 Claims, 3 Drawing Figures

THIN FILM RESISTANCE TEMPERATURE DETECTOR

This invention is directed to resistance temperature detectors (RTD's) and in particular to a novel structure for thin film resistance temperature detectors.

Resistance elements in presently used resistance temperature detectors (RTD's) or as they are more commonly called resistance thermometers are usually formed by winding platinum or other resistance type wire into the outer surface of a cylindrically shaped insulating material usually aluminium oxide. Making a good mechanical and electrical connection between the resistance element wire and the two lead wires has been a serious problem in that the gauge or size of these two wires are vastly different. In many instances a mechanical type joint has been used by splitting the larger gauge lead wires and crimping the smaller gauge element wires between the two halves. With this type of connection thermal stresses sometimes results in high impedance and mechanical shock or vibration sometimes result in "open circuits". The connection problem however is not limited to cylindrical shaped elements but exists solely in the wire wound type of element regardless of the shape.

It is therefore an object of this invention to provide a novel structure for connecting lead wires to a thin film resistance element.

It is another object of this invention to provide a highly reliable thin film resistance temperature detector.

It is a further object of this invention to provide an RTD which is tip sensitive.

It is another object of this invention to provide an RTD which has a high speed of response to temperature change.

These and other objects are achieved in an RTD which includes a substrate of refractory dielectric material having two or more holes bored through it. A plug of electrically conductive material is fixed within each hole in proximity to one end surface of the substrate, with the plug surface preferably having a concave meniscus shape and consisting of a metal alloy such as Ti-Ni. Lead wires, such as Ni wires are located in the holes and are connected to the plug through the other end surface. A film of temperature dependent resistance material is deposited on the one end surface of the substrate and is connected to the two plugs. The film may consist of a thin sensing film of metal such as platinum or of a semiconductor material deposited in a selected pattern on the substrate and in direct contact with the plugs, or the sensing film may be deposited so as to connect pads of electrical conducting material which are deposited to cover at least a portion of the plugs. The end surface of the RTD may further have a layer of electrical insulating material to protect the sensing film.

Figure 1:
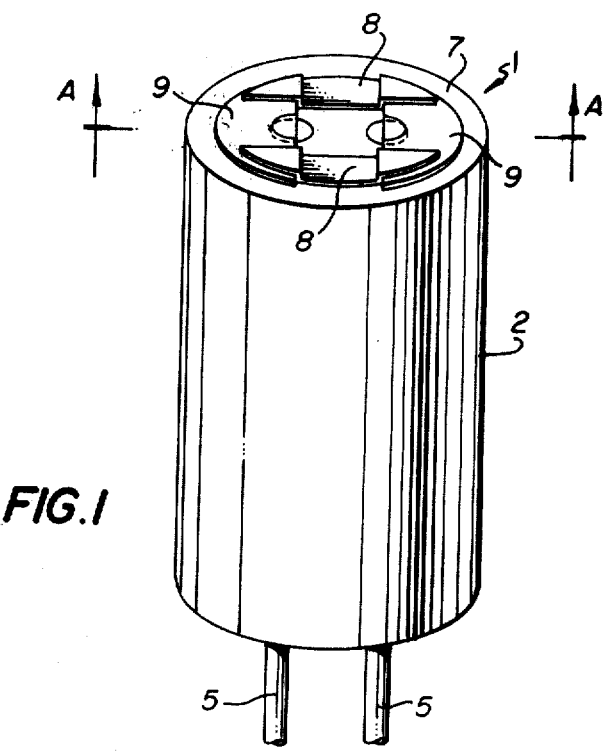
FIG. 1 illustrates in perspective the preferred embodiment of an RTD in accordance with this invention.

The resistance temperature detector (RTD) 1 includes a base element or substrate 2 made of a refractory dielectric material such as high purity alumina. It may have any desired shape or length and has a number of holes 3 bored through its length. For a simple probe type RTD, a cylindrical shaped substrate 2 having two holes 3 is preferred. RTD 1 further includes a tight fitting metal plug 4 in each of the holes 3 to which the lead wires 5 are connected. In order to insure that the plug-lead bond is reliable, the plug 4 may be formed by pressing a metal wire of predetermined length into the hole 3 to be followed by a lead wire 5 under a weight and heating the substrate to a temperature at which contact fusion occurs between the pressed wire and the weighted lead wire 5 to obtain an alloy melt. The weight drives the lead wire 5 into the hole 3 in substrate 2 until a plug 4 of predetermined alloy composition is formed. The plugs 4 may be formed from a titanium pressed wires and nickel leads 5 at temperatures of approximately 1186° to 1189° C.

In addition to the formation of a reliable connection between the plugs 4 and leads 5, the above process results in a plug having a concave meniscus 6 at the top surface 7 of the substrate 2. The concave meniscus 6 in plug 4 minimises failures due to thermal expansion mismatch between the plug 4 and the substrate 2 which causes the plug 4 to break away from the substrate 2 when the RTD's operate over a broad temperature range.

A thin film 8 of temperature sensitive resistive material such as a metal, i.e. platinum or other conventionally used metal, or a semiconductor for high sensitivity temperature detection, is deposited over the top surface 7 of probe 1 to form a resistive path between the plugs 4 and thus leads 3.

Figure 3:
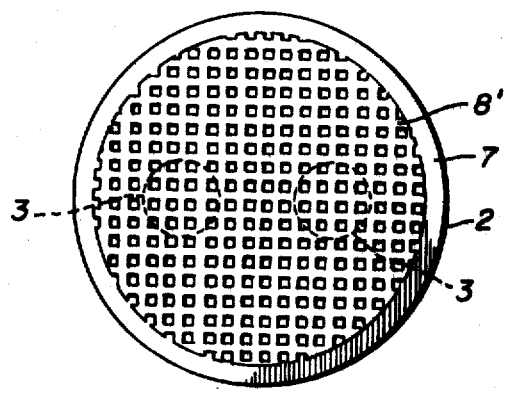
FIG. 3 illustrates an alternate pattern of the temperature sensing film in accordance with this invention, The preferred embodiment of the present invention is described with reference to the drawings wherein like components have been give like reference numbers.

Film 8 may be continuous, or it may be deposited to form a pattern such as a meander, zig-zag or ladder which extends the current path length and achieves adequately high resistance values. However, for simplicity in manufacture, the film 8 may consist of a fine grid deposited over the end surface 7, where the grid 8' dimensions are small with respect to the plug 4 dimensions and separation as shown in FIG. 3. The grid pattern approximates a continuous resistor of higher sheet resistance and the resistance of the device is merely the spreading resistance of the pattern. Since the grid areas towards the edge of the pattern carry relatively little current, they may be used for fine adjustment of the zero point resistance of the film 8' by scribing or otherwise removing resistor material. The grid pattern thin film 8' may be formed on the surface 7 of substrate 2 by any conventional method. One such method could include the placing of a fine work screen over the end surface 7 and depositing a material, such as beryllium-copper, such that a fine pattern of dots is obtained when the screen is removed. The resistive material is then deposited over the surface 7 and the RTD 1 is placed in an etch, such as ferric chloride, which attacks the beryllium-copper dots, thus separating the resistive material in these spots from the rest of the film. When these loose spots are washed away, the fine mesh pattern 8' directly deposited onto substrate 2 remains.

The thickness of the thin film 8 will depend on the material used as well as the desired characteristics of the RTD 1, though metal films may be up to 100 A thick.

Figure 2:
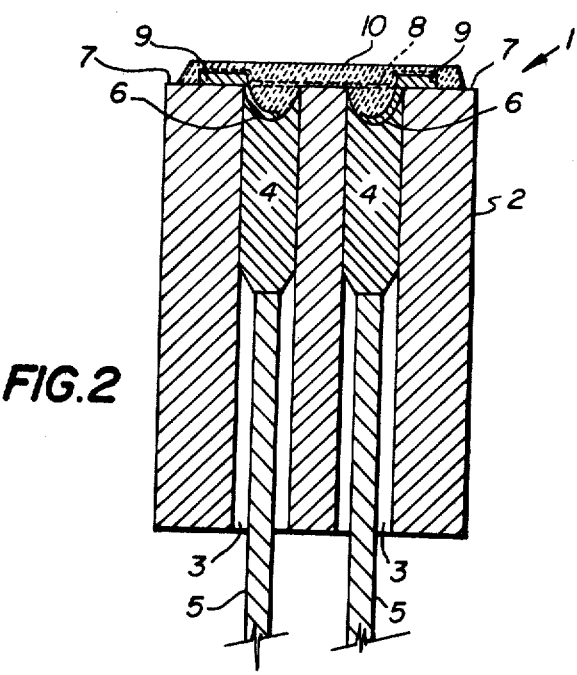
FIG. 2 is a cross-section of the RTD in FIG. 1.

It has been found that under certain operating conditions of the RTD 1, such as in the measurement of very high temperatures, the plug 4 may oxidize by oxygen permeating the thin film 8, the resulting layer may provide a series resistance between the plug 4 and the thin film 8. To prevent oxidation of the plugs 4, an atomically thick film or pad 9 of the same material is deposited on part of or the total surface of plugs 4 before the deposition of thin film 8. For the thin film 8' in FIG. 3, pads 9 may be deposited specifically on plugs 4. However, as shown in FIGS. 1 and 2, pads 9 may be deposited partially on plugs 4 and on the top surface 7 of substrate 2, with the thin film 8 deposited across the ends of pads 9. Since the thin film 8 is not deposited directly on plugs 4, but to either side, this assures a reliable RTD 1 which will not have a change in characteristics through usage. The pads 9 must be thick enough to prevent oxidation of the plug under the pads 9, for platinum a thickness of 1000 A is considered sufficient.

The RTD 1, may further include a deposited film 10 of electrical insulation material over the films 8 and 9 to protect the sensing film 8 and to facilitate packaging.

We claim:
1. A resistor temperature detector comprising:
    substrate means of refractory dielectric material having at least two spaced holes through the length of the substrate means;
    plug means of electrical conducting alloy fixed in each of the holes in proximity to one end surface of the substrate means, the alloy including a predetermined metal;
    a lead wire made of the predetermined metal located within each of the holes from the other end surface of the substrate means and connected to the plug means; and
    film means of temperature dependent resistor material deposited on the one end surface of the substrate means and connected to the plug means.

2. A resistor temperature detector as claimed in claim 1 wherein said plug means has a concave meniscus shape at the one end surface of the substrate means.

3. A resistor temperature detector as claimed in claim 2 wherein said film means consists of an atomically thick pad of conducting material deposited on at least a portion of each plug means surface to prevent oxidation of the plug means surface and a sensing film of temperature dependent resistor material deposited on the substrate surface electrically connecting the thick films.

4. A resistor temperature detector as claimed in claim 3 wherein the sensing film consists of a thin film of metal.

5. A resistor temperature detector as claimed in claim 2 wherein the plug means consists of a Ti-Ni alloy.

6. A resistor temperature detector as claimed in claim 3 wherein the plug means consists of a Ti-Ni alloy and the sensing film consists of platinum having a thickness up to 100 A.

7. A resistor temperature detector as claimed in claim 6 wherein the pad consists of platinum having a thickness greater than 1000 A.

8. A resistor temperature detector as claimed in claim 7 which further includes an electrical insulating film deposited over the entire one end surface of the substrate.

9. A resistor temperature detector as claimed in claim 7 wherein the substrate consists of alumina.

10. A resistor temperature detector as claimed in claim 2 wherein the film means has a grid pattern.

11. A resistor temperature detector as claimed in claim 4 wherein the sensing film has a grid pattern.

12. A resistor temperature detector as claimed in claim 3 wherein the sensing film consists of a thin film of semiconductor material.

* * * * *